United States Patent
Tang et al.

(10) Patent No.: US 7,106,118 B2
(45) Date of Patent: Sep. 12, 2006

(54) CLOCK SIGNAL GENERATOR WITH LOW POWER COMSUMPTION FUNCTION AND METHOD THEREOF

(75) Inventors: Sen-Huang Tang, Luodong Township, Yilan County (TW); Yi-Shu Chang, Tainan (TW)

(73) Assignee: Realtek Semiconductor Corp., (TW)

( * ) Notice: Subject to any disclaimer, the term of this patent is extended or adjusted under 35 U.S.C. 154(b) by 0 days.

(21) Appl. No.: 11/035,088

(22) Filed: Jan. 13, 2005

(65) Prior Publication Data

US 2005/0156650 A1   Jul. 21, 2005

(30) Foreign Application Priority Data

Jan. 16, 2004 (TW) ............................... 93101101 A
Feb. 13, 2004 (TW) ............................... 93103420 A

(51) Int. Cl.
*G06F 1/04* (2006.01)

(52) U.S. Cl. ..................................... 327/291; 327/298

(58) Field of Classification Search ................ 327/144, 327/291, 298, 344, 355, 261, 276, 278, 279, 327/544, 156, 147, 149, 158, 375, 376
See application file for complete search history.

(56) References Cited

U.S. PATENT DOCUMENTS

| | | | | |
|---|---|---|---|---|
| 5,742,194 A * | 4/1998 | Saeki | .......................... | 327/298 |
| 5,771,264 A * | 6/1998 | Lane | .......................... | 375/376 |
| 6,064,252 A * | 5/2000 | Nara | .......................... | 327/544 |
| 6,633,190 B1 * | 10/2003 | Alvandpour et al. | ........ | 327/291 |
| 6,819,150 B1 * | 11/2004 | Santosa et al. | ............. | 327/141 |

* cited by examiner

*Primary Examiner*—Quan Tra
*Assistant Examiner*—Rey Aranda
(74) *Attorney, Agent, or Firm*—Raymond Sun

(57) ABSTRACT

The invention is related to a method and an apparatus for generating an output clock. The method comprises: measuring a reference clock according to a free-run clock to produce a counter signal in a normal mode; suspending the reference clock; and generating the output clock according to the counter signal and the free-run clock in a power-saving mode.

20 Claims, 3 Drawing Sheets

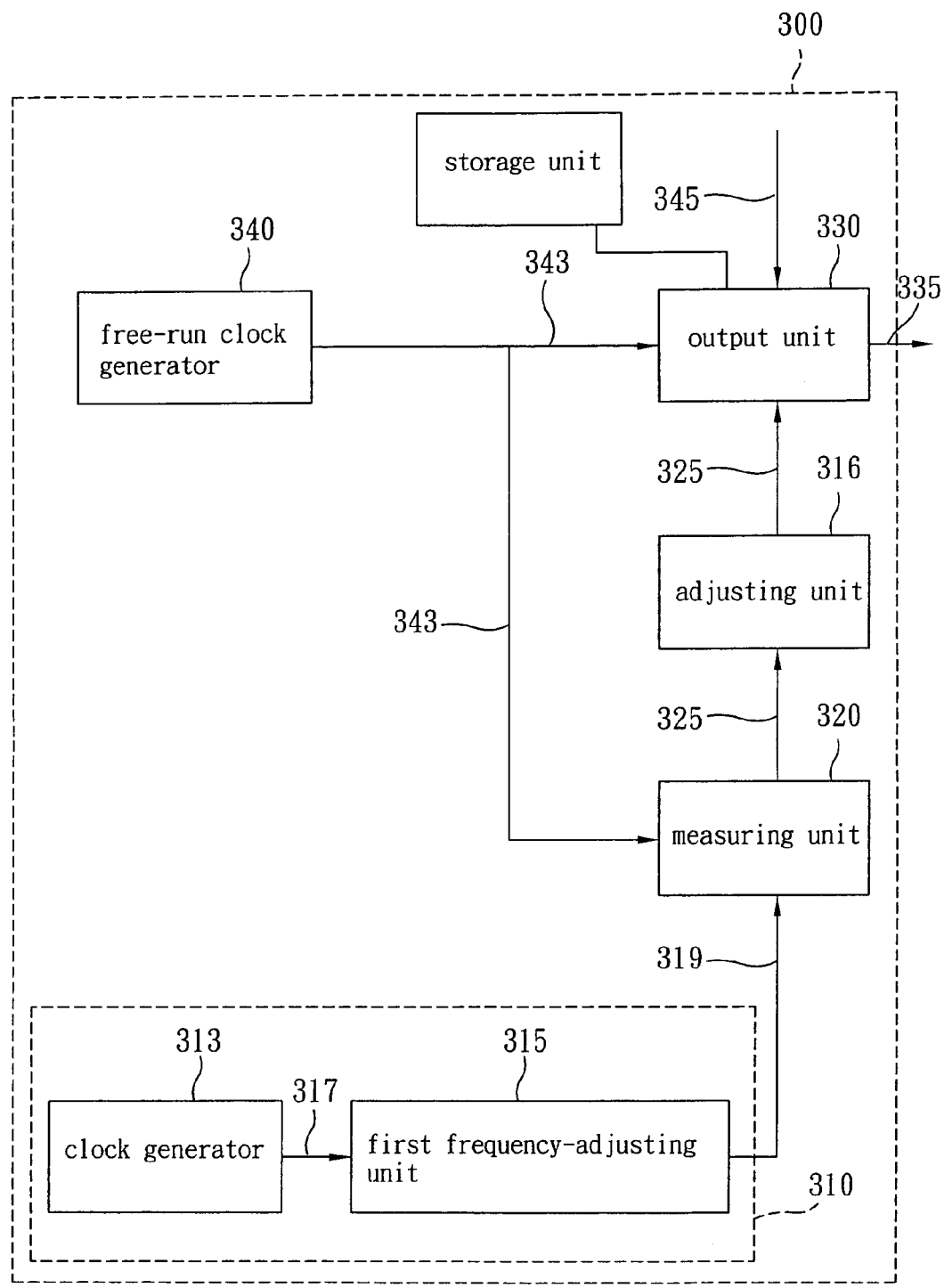
F I G. 1

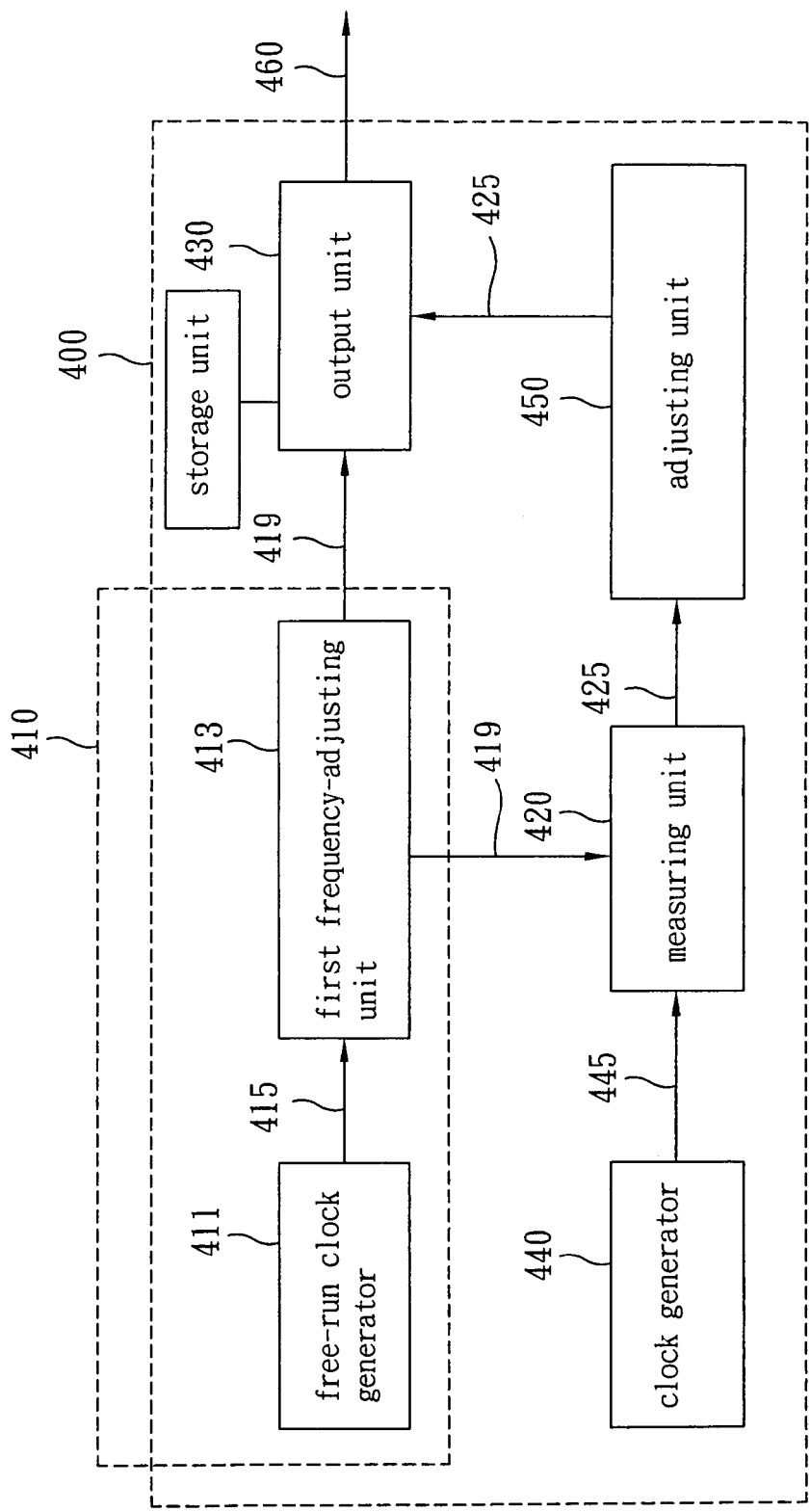
F I G. 2

CLOCK SIGNAL GENERATOR WITH LOW POWER COMSUMPTION FUNCTION AND METHOD THEREOF

This application claims the benefit of Taiwan application serial no. 93103420, filed on Feb. 13, 2004 and Taiwan application serial no. 93101101, filed on Jan. 16, 2004, the subject matter of which is incorporated herein by reference.

BACKGROUND OF INVENTION

1. Field of the Invention

This invention relates to an apparatus and a method for generating an output clock, particularly relates to an apparatus and a method for generating an output clock signal using a free-run clock generator.

2. Description of the Prior Art

The reference clock generator is a very popular device for providing a reference clock. Conventionally, a reference clock generator can be an oscillator or a combination of a crystal and an oscillation circuit. The power consumptions of these kinds of reference clock generators are high.

The electronic device can operate in a power-saving mode or a sleep mode to reduce the power consumption of the electronic device. When the electronic device operates in the power-saving mode or the sleep mode, the electronic device periodically check whether the electronic device receives the link signal or not and determines whether the electronic device need to operate in the normal mode.

The conventional method is utilized an external component, such as a resistor or a capacitor, and an internal component, such as a resistor or a capacitor, to generate a clock signal having a long period according to a RC constant. However, this long period clock signal is not stable that the period may change with the changes of temperature, voltage or/and the manufacture process of semiconductor.

In additions, an integrated circuit (IC) includes a phase-lucked loop (PLL) and needs at least one pin, which receives an external clock. The PLL produces the other reference clock according to the external clock.

SUMMARY OF INVENTION

It is therefore one of the objectives of the claimed invention to provide an apparatus and method for generating an output clock. The apparatus and method can reduce the power consumption of generating the output clock.

It is therefore one of the objectives of the claimed invention to provide an apparatus and method for generating an output clock. The frequency of the output clock will be robust to the changes of the voltage, temperature and/or the manufacture process.

It is therefore one of the objectives of the claimed invention to provide an apparatus and method for generating an output clock. The apparatus and method have a self-calibration or/and real-time calibration functions.

According to the present invention, a method for generating an output clock comprises: generating a free-run clock; generating a first clock in a first mode; measuring the first clock according to the free-run clock to generate a counter signal; generating the output clock according the free-run clock and the counter signal in a second mode; and suspending the first clock in the second mode.

Preferably, the period of the output clock in a second mode can be adjusted when the counter signal is adjusted. For example, the counter signal can be divided by or multiplied by the adjusting value.

According to the present invention, an apparatus for generating an output clock comprises: a clock generator for generating a reference clock in a first mode and suspending the reference clock in a second mode; a free-run clock generator for generating a free-run clock; a comparator for measuring the reference clock according to the free-run clock in the first mode to generate a counter signal; and an output circuit for outputting the output clock according to the free-run clock and the counter signal in the second mode.

Preferably, the clock generator of the invention further includes an adjusting unit. This adjusting unit receives the counter signal from the comparator, adjusts the value of the counter signal and outputs the adjusted counter signal to the output circuit.

These and other objectives of the claimed invention will no doubt become obvious to those of ordinary skill in the art after reading the following detailed description of the preferred embodiment that is illustrated in the various figures and drawings.

BRIEF DESCRIPTION OF THE DRAWINGS

The details of the present invention will be more readily understood from a detailed description of the preferred embodiments taken in conjunction with the following figures.

FIG. 1 shows a block diagram of a first embodiment of the clock generator according to the present invention;

FIG. 2 shows a block diagram of a second embodiment of the clock generator according to the present invention.

DETAILED DESCRIPTION

Figure 3:
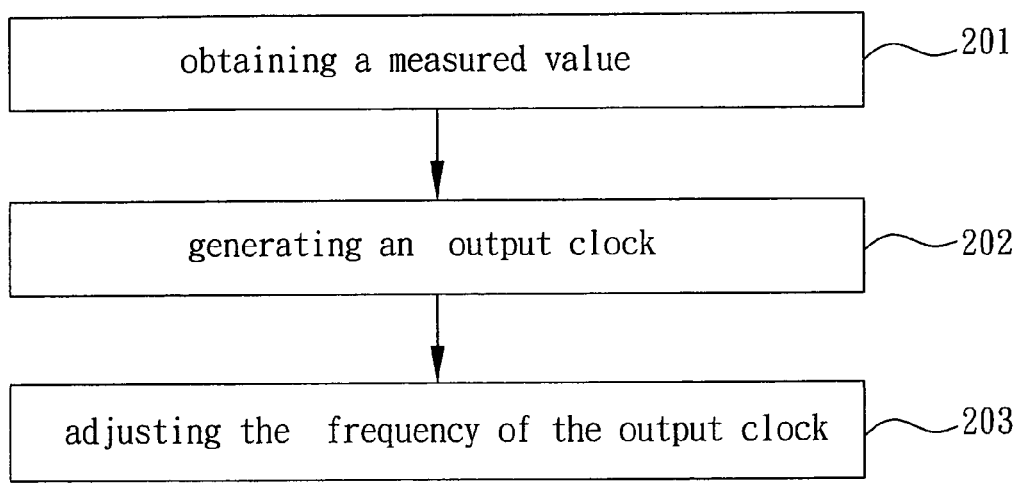
FIG. 3 shows a flowchart of an embodiment of the method for generating an output clock according to the present invention.

Please refer to FIG. 1. FIG. 1 shows an embodiment of the low power consumption clock generator of this invention. In FIG. 1, the low power consumption clock generator 300 comprises a clock generator 310, a measuring unit 320, an output unit 330, and a free-run clock generator 340. The power consumption of the free-run clock generator 340 is lower than that of the clock generator 310.

Generally speaking, the clock generator 310 is a high power consumption clock generator and generates an accuracy reference clock 319. In an embodiment, the clock generator 310 further includes a clock generator 313 and a first frequency-adjusting unit 315. The clock generator 313 generates a clock signal 317. The first frequency-adjusting unit 315 can be omitted. The first frequency-adjusting unit 315 can be a divider or a counter.

In the first mode, the measuring unit 320 uses the free-run clock 343 generated by the free-run clock generator 340 to measure (count) the accuracy reference signal 319 and obtain the measured value 325. The power consumption of the free-run clock generator is lower than that of the clock generator 310. In an embodiment, the measured value 325 generated by the measuring unit 320 can be adjusted by the adjusting unit 316 and then stored in the storage unit (not show in FIG. 1). The storage unit can be a register or an on-chip memory or RAM or others. The adjusting unit 316 can be omitted.

In the second mode, the high power consumption clock generator 310 can be suspended to reduce the power consumption of the clock generator of the invention. The output unit 330 outputs a clock signal 335, which is corresponding to the reference signal 319, according to the measured value 325 and the free-run clock 343. The output unit 330 can also adjust the frequency of the clock signal 335 according to a control signal 345. In one embodiment, the free-run clock generator 340 comprises a RC oscillator circuit. The measuring unit 320 can be a first counter and the measured value is a counter value. The output unit 330 can be a second counter. The measured value can be a non-integer.

In a preferred embodiment, the first mode can be a calibration mode or a normal mode. In another preferred embodiment, the second mode can be a power-saving mode or a sleep mode.

Please refer to FIG. 2. FIG. 2 shows another embodiment of the clock generator of this invention. In the FIG. 2, the low power consumption clock generator 400 comprises a free-run clock generator 410, a measuring unit 420, an output unit 430, a reference clock generator 440 and the adjusting unit 450. The power consumption of the free-run clock generator 410 is lower than that of the precise clock generator 440.

In the embodiment, the free-run clock generator 410 is different from the high power consumption clock generator 310 in FIG. 1. The free-run clock generator 410 generates a free-run clock 419 to the output unit 430. In an embodiment, the free-run clock generator 410 further comprises a clock generator 411 and a first frequency-adjusting unit 413. The clock generator 411 generates a clock signal 415 which is then transmitted to and adjusted by the first frequency-adjusting unit 413. The first frequency-adjusting unit 413 can be omitted.

In a first mode, the measuring unit 420 uses the clock signal 445, which generated by the clock generator 440, to measure (count) the free-run clock 419 from the free-run clock generator 410, and obtains a measuring value 425. In an embodiment, the measured value 425, which is outputted from the measuring unit 420, is modified by the adjusting unit 450 and outputted to an output circuit 430. The output circuit 430 can record (store) the measured value 425. In this embodiment, the adjusting unit 450 can be omitted.

In a second mode, the clock generator 440 stops operating. The output unit 430 uses the stored measured value 425 and the free-run clock 419, and outputs the output clock 460.

In one embodiment, the free-run clock generator 410 comprises a RC oscillator circuit.

As illustrated in FIG. 1 and FIG. 2, whether through using the free-run clock signal to count (measure) the reference signal or through using the reference signal to count (measure) the free-run clock signal, the relationship between (ratio of the period of) the free-run clock signal and the reference signal can be obtained. This ratio is the measured value. Although the frequency of the free-run clock signal is unknown, the output clock which is substantially the same as the reference signal generated by the clock generator 310 or 440 is generated according to the measured value and the free-run clock. In additions, when the operating temperature changes, the clock generator of this invention can be self-calibration to optimize the measured value, which is the ratio of the period of the free-run clock signal and the reference signal. Therefore, the errors caused by the changes of operation environment, such as temperature, voltage, can be avoided.

Please refer to FIG. 3. FIG. 3 shows the procedures of an embodiment of the low power consumption clock generator in this invention. Please also refer to FIG. 1 and FIG. 2.

In step 201: in the first mode, the free-run clock 343 (419) is used to measure (count) the reference signal 319 (445) generated by the clock generator. A measured value 325 (425) is then obtained. The measured value 325 (425) can be an integer or a non-integer value.

In step 202: the output clock 330 (430) is outputted according to the free-run clock 343 (419) and the measured value 325 (425) obtained in the step 201. Because the measured value 325 (425) is corresponding to the reference signal 319 (445) outputted from the clock generator 310 (440). After obtaining the measured value 325 (425), the low power consumption clock generator of the present invention enters the second mode in which the clock signal generator 310 (440) stop operating to reduce the power consumption of the clock generator of the present invention. In an embodiment, the measured value 325 (425) can be adjusted by the adjusting unit 316 (450).

In step 203: the measured value 325 (425) can be adjusted according to an adjusting signal 345 to control the frequency of the output clock 460.

As illustrated previously, through a free-run clock 419, the relationship between (ratio of the period of) the free-run clock and the reference signal can be obtained, whether using the free-run clock signal to count the reference signal or using the reference signal to count the free-run clock signal. This ratio is the measured value. The output clock can be generated according to the measured value. If the reference signal is inputted externally, the output clock will not vary with the changes of the voltage, temperature or the manufacturing process and the frequency of the output clock can be fixed.

In other words, the invention can utilize the free-run clock generator to output an output clock which has the same frequency of the reference clock generated by the clock generator.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An apparatus for generating an output clock comprising:
   a first clock generator for generating a first clock according to a first clock;
   a second clock generator for generating a second clock;
   a measuring unit for measuring the first clock according to the second clock to generate a measured signal; and
   an output circuit for outputting the output clock according to the second clock and the measured signal;
   wherein the first clock generator is suspended when the measured signal is generated.

2. The apparatus of claim 1, wherein the measuring unit comprises a first counter.

3. The apparatus of claim 1, wherein the output unit comprises a second counter.

4. The apparatus of claim 1, further comprises:
   a storage unit coupled to the output circuit for storing the measured signal.

5. The apparatus of claim 1, wherein the power consumption of the first clock generator is larger than that of the second clock generator.

6. The apparatus of claim 1, further comprising:
   an adjusting unit, coupled between the measuring unit and the output unit, for adjusting the value of the measured signal according to a control signal.

7. The apparatus of claim 6, wherein the adjusting unit is a counter or a divider.

8. The apparatus of claim 1, wherein the first clock generator is suspended such that the power consumption is reduced.

9. A method for generating an output clock, comprising:
generating a first clock;
generating a second clock;
generating a measured signal according to the first clock and the second clock;
generating the output clock according the second clock and the measured signal; and
suspending the first clock.

10. The method of the claim 9, wherein the power consumption of generating the first clock is larger than that of generating the second clock.

11. The method of claim 9, further comprising:
storing the measured signal in a storage unit.

12. The method of claim 9, wherein the measured signal is a non-integer.

13. The method of claim 9, wherein the suspending the first clock step is in a power-saving mode.

14. A method for generating an output clock, comprising:
generating a first clock in a first mode;
generating a second clock;
producing a measured signal according to the first clock and the second clock;
generating the output clock according the measured signal and the second clock in a second mode; and
stopping the first clock in the second mode.

15. The method of claim 14, wherein the power consumption of generating the first clock is larger than that of generating the second clock.

16. The method of claim 14, further comprising:
storing the measured value in a storage unit.

17. The method of claim 14, wherein the value of the measured signal is a non-integer.

18. The method of claim 14, wherein the first mode is a calibration mode.

19. The method of claim 14, wherein the second mode is a sleep mode.

20. The method of claim 14, wherein the second mode is a power-saving mode.

* * * * *